United States Patent [19]
Boyce

[11] Patent Number: 4,748,338
[45] Date of Patent: May 31, 1988

[54] OCEAN WAVE ENERGY EXTRACTING EROSION REVERSAL AND POWER GENERATION SYSTEM

[76] Inventor: Peter F. Boyce, Delsea Dr., Delmont, N.J. 08314

[21] Appl. No.: 46,548

[22] Filed: May 6, 1987

Related U.S. Application Data

[63] Continuation-in-part of Ser. No. 903,582, Sep. 4, 1986.

[51] Int. Cl.⁴ ............................ F03B 13/10; E02B 3/06
[52] U.S. Cl. ......................................... 290/42; 290/53; 405/28; 405/26; 416/DIG. 4; 416/DIG. 6; 416/86; 417/331
[58] Field of Search ................. 290/53, 42, 54, 43; 417/330–334, 337, 61; 416/84–86, 117, DIG. 4, DIG. 6; 60/398, 486, 497–502, 505, 506; 405/28, 26, 22, 21, 15

[56] References Cited

U.S. PATENT DOCUMENTS

| | | | |
|---|---|---|---|
| 1,389,513 | 8/1921 | Kellner | 405/28 |
| 4,317,047 | 2/1982 | de Almada | 290/53 |
| 4,476,397 | 10/1984 | Lawson | 290/54 |
| 4,608,497 | 8/1986 | Boyce | 290/53 |

Primary Examiner—William M. Shoop, Jr.
Assistant Examiner—Sharon D. Logan

[57] ABSTRACT

An ocean wave energy extracting beach sand erosion reversal and electric power generation system. Moored seaward of the breaker zone it serves the function of beach sand accretion by extracting energy from the waves prior to their breaking thereby lessening turbulence responsible for tossing sand into suspension to then be swept away by currents.

Two pontoons support a series of pyramidal frameworks from which is suspended a strong, flexible, weighted pendulum which is the drive shaft of a large electric generator. The pendulum is caused to swing by the undulations of the ocean waves. The pendulum is caused to rotate as it swings by means of loops of cable and ratcheted pulleys thereby beccoming a drive shaft to turn a large generator.

By applying the force of the rotating pendulum to turn an electric generator, electricity is produced as a by-product of erosion reversal.

8 Claims, 1 Drawing Sheet

U.S. Patent
May 31, 1988
4,748,338
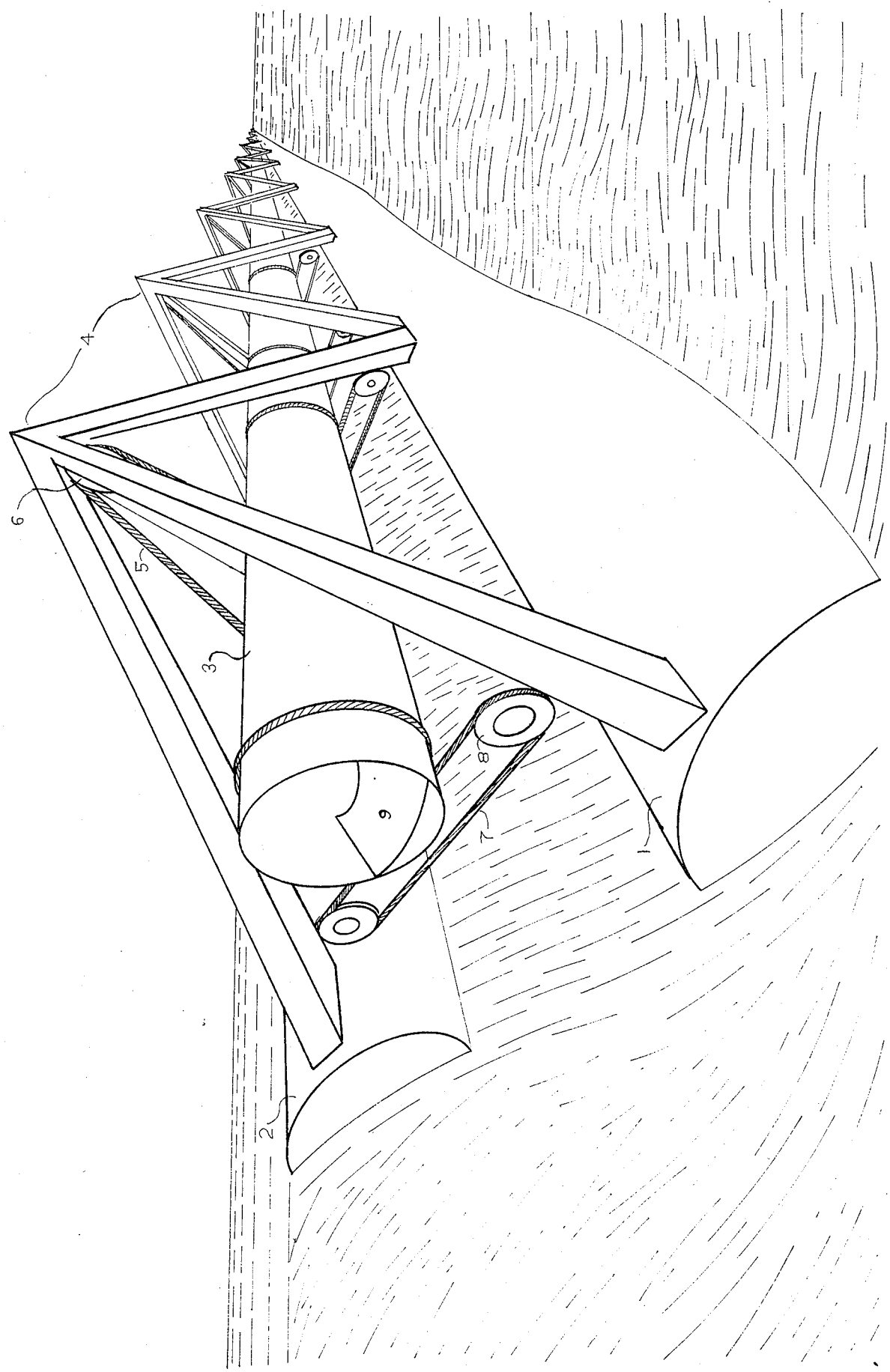

OCEAN WAVE ENERGY EXTRACTING EROSION REVERSAL AND POWER GENERATION SYSTEM

Bouyant members #1 and #2 rise and fall alternately, effected by the undulations of the ocean waves. A pendulum #3 which is the flexible driveshaft of a large remotely located electric generator is suspended from the apexes of a series of quadrapods #4 and is caused to swing effected by the rocking of the quadrapods which are supported by the bouyant members. At the apex of each of the quadrapods in the series is mounted a ratcheted suspension pulley #6. Through each of these suspension pulleys passes a suspension cable #5. The suspension cable in each unit passes over the pulley, downward, around the underside of the pendulum and upward to its point of beginning, thereby suspending the pendulum within a continuous loop of cable. The pendulum suspended in this manner is free to both swing and rotate about a horizontal axis. As the pendulum swings, it is caused to rotate about a hoizontal axis by drive cables #7. There are two drive cables for each quadrapod in the series. Each drive cable begins at a point on top of the pendulum, proceeds downward around the underside of the pendulum, away from the pendulum to a ratcheted drive pulley #8 mounted on the leg of the quadrapod. The drive cable continues through the top of the pulley around it to the underside and away to the underside of another drive pulley mounted on the opposite leg, around the pulley, upward and away to the underside of the pendulum, around the pendulum, upward, merging with its point of beginning, forming a continuous loop.

As the pendulum swings leeward, it pulls on the drive cables. The drive cables, being looped around the drive pulleys, pull on and exert a turning force on the drive pulleys. The rachets on the drive pulleys prevent the pulleys from turning in the leeward direction, causing the pendulum to roll within the loops of drive cables inorder to complete its leeward swing. As the pendulum completes its leeward swing, the momentum of the force of rotation of the rolling pendulum and the direction of the return swing cause the direction of pull on the drive cables to be reversed and the reversal of the direction of turning force applied to the drive pulleys. The rachets on the drive pulleys do not prevent them from turning in the seaward direction thereby permitting the drive cables to be pulled and moved by both the rotation of and seaward swing of the pendulum. In this way the pendulum is caused to rotate by rolling within a loop of drive cable which passes through a ratcheted drive pulley the rachet of which is engaged during the leeward swing and on the return swing the pendulum is free to continue the same direction of rotation. While moored seaward of the breaker zone, anchored securely so as to not be driven seaward or beachward, the system reverses the process of beach sand erosion by extracting energy from the waves by the means described above. The extraction of energy evidenced by electric power generation results in weaker waves and correspondingly less turbulence upon their breaking. A reduction in turbulence correspondingly results in less beach sand being tossed into suspension to be swept away by currents. Sand already in suspension carried into these calmer waters by the currents, upon settling out of suspension is less vulnerable to being put back into suspension due to the reduced turbulence. In this manner beach accretion is facilitated.

When the system is moored in a relatively shallow depth of water such as a bay and is in a circular formation, sand being carried by currents into the calmer waters encompassed by the system will upon settling out of suspension be less vulnerable to being put back into suspension thus resulting in the formation of a shoal and eventually an island.

The pendulum is hollow and may be filled with sand, seawater or alike to increase its force of swing and rotation or it may be emptied for minimal resistance during towing.

The hollow pendulum may be fitted inside with a spiraling fin #9 enabling it to to transport fluid from one location to another as the pendulum rotates and augers the fluid forward through the pendulum.

I claim:

1. In an apparatus for extracting energy from the waves on a body of water thereby reversing coastal erosion including an assembly having a bouyancy sufficient for maintaining said assembly afloat in the water, the improvements comprising
   (a) a series of structures mounted on the assembly having generally upwardly oriented beams having upper ends connected at least indirectly to one another
   (b) a pendulum driveshaft suspended by cable from the upper ends of said beams
   (c) each structure having a pulley at the upper ends of said beams through which a continuous loop of said cable passes for suspending said pendulum driveshaft and permitting said pendulum drive shaft to rotate
   (d) a racheted pulley mounted at the lower end of each of said beams through which a second continuous loop of cable passes said second continuous loop of cable also loops around said pendulum driveshaft causing said pendulum driveshaft to rotate as it swings by rolling within the loop of said second cable which is anchored by the ratcheted pulley, said second cable being prevented from turning by said rachet during the pendulum's forward swing said rachet however enabling said pulley to turn during the return swing of the pendulum thereby permitting the pendulum to continue the same direction of rotation during both the forward and return swings.

2. An apparatus as defined in claim 1 further comprising a spiraling fin within the pendulum so as to provide for the augering of sand, water or other material from one location to another through the rotating pendulum.

3. An apparatus as defined in claim 1 further comprising an electric generator coupled to the pendulum driveshaft for converting the force of the pendulum's rotation into electricity.

4. An apparatus as defined in claim 3 further comprising a gear motor coupled to the output of the pendulum driveshaft and the input shaft of the electric generator.

5. An apparatus as defined in claim 1 wherein the pendulum is hollow and may be filled with a heavy material to add force to the swing of the pendulum or emptied to reduce the apparatus'weight for more efficient towing.

6. An apparatus as defined in claim 1 wherein chains and gears are substituted for cables and pulleys.

7. An apparatus as defined in claim 1 wherein ropes are substituted for cables.

8. An apparatus as defined in claim 1 in which the series is in a circular configuration so as to cause sand accretion within the perimeter of the series resulting in the formation of a shoal and eventually an island.

* * * * *